United States Patent [19]
Ohmura

[11] Patent Number: 5,481,820
[45] Date of Patent: Jan. 9, 1996

[54] REEL SEATS FOR FISHING RODS

[75] Inventor: Ryuichi Ohmura, Shizuoka, Japan

[73] Assignee: Fuji Kogyo Co., Ltd., Shizuoka, Japan

[21] Appl. No.: 225,937

[22] Filed: Apr. 11, 1994

Related U.S. Application Data

[63] Continuation of Ser. No. 53,857, Apr. 29, 1993, abandoned.

[30]     Foreign Application Priority Data

Apr. 30, 1992  [JP]  Japan .................................. 4-137729

[51] Int. Cl.⁶ .................................................. A01K 87/06
[52] U.S. Cl. ............................................................ 43/22
[58] Field of Search ............................ 43/22, 23, 18.1, 43/18.5

[56]            References Cited

U.S. PATENT DOCUMENTS

| | | | |
|---|---|---|---|
| 4,077,150 | 3/1978 | Barnes | 43/22 |
| 4,334,378 | 6/1982 | Worth | 43/22 |
| 4,821,447 | 4/1989 | Nakayama et al. | 43/22 |
| 4,864,764 | 9/1989 | Yamato | 43/22 |
| 4,918,852 | 4/1990 | Yamato | 43/22 |
| 5,189,824 | 3/1993 | Yamato | 43/22 |
| 5,199,207 | 4/1993 | Nakagawa | 43/22 |
| 5,347,742 | 9/1994 | Ohmura | 43/22 |

*Primary Examiner*—P. Austin Bradley
*Assistant Examiner*—Chuck Y. Mah
*Attorney, Agent, or Firm*—Evenson, McKeown, Edwards & Lenahan

[57]            ABSTRACT

Reel seats detachably securing a fishing reel A to fishing rods without injuring a leg B of the fishing reel A and a hood portion of the reel seats, a movable hood integrally made with the hood portion and a nut portion being engaged with an external thread on a reel seat body, and a fastening metal link which serves to fasten the leg B of the fishing reel A to the reel seat body being rotatably disposed with respect to and within the hood portion.

6 Claims, 1 Drawing Sheet

REEL SEATS FOR FISHING RODS

This application is a continuation of U.S. application Ser. No. 08/053,857 filed Apr. 29, 1993 now abandoned.

BACKGROUND OF THE INVENTION

1. Field of the Invention

This invention relates to a reel seat for a fishing rod which serves to detatchably secure a fishing reel to the fishing rods.

2. Statement of the Prior Art

Reel seats having a movable hood made integrally with a nut portion and a hood portion which fastens a leg of a fishing reel are disclosed in for example, Japanese Patent Publication No. 56(1981)-32882.

In case of a hood portion made with metal in prior art, fastening the leg, it tends to hurt an external appearance of the leg. In case of a hood portion made with synthetic resin prior art, fastening the leg, the inside of the hood portion tends to be scraped by the leg and this results in causing cracks in the hood portion or an failure of fastening of reel legs.

SUMMARY OF THE INVENTION

An object of the present invention is to provide reel seats for sufficient fastening force without damage both the leg of a fishing reel and the hood portion.

In order to achieve the object, the reel seats in accordance with the present invention has a movable hood integrally made with a hood portion and a nut portion, wherein a fastening piece is rotatably disposed with respect to and within said hood portion.

The fastening piece may be made of a synthetic resin material but it is preferably made of a metal material.

In the reel seats of the present invention, there is caused a relative slip between the hood portion and the fastening piece.

Even if the end of the leg of the fishing reel bites when fastening the leg, the hood portion can turn so sufficiently that it fastens the leg in case of using the synthetic resin material. On the other hand, in case of using the metal fastening piece, the end of the leg of the fishing reel does not bite on the fastening piece.

DETAILED DESCRIPTION OF THE PREFERRED EMBODIMENTS

Figure 1:
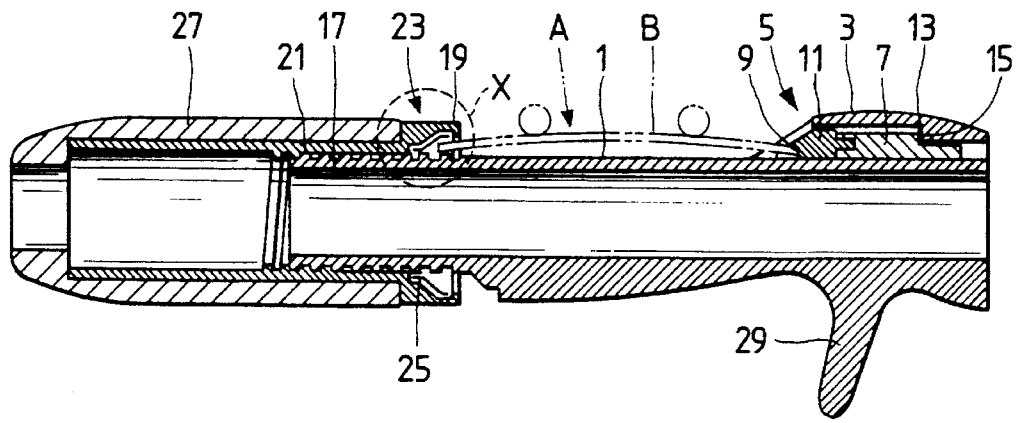
FIG. 1 is a longitudinal sectional view of an embodiment of reel seats for fishing rods in accordance with the present invention.
Figure 2:
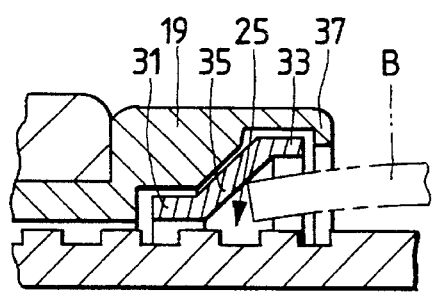
FIG. 2 is an enlarged view taken from a circle X in FIG. 1.

Referring now to FIGS. 1 and 2, a first embodiment of the reel seats for fishing rods in accordance with the present invention will be explained below.

A tubular reel seat body 1 is provided with a stationary hood portion 3 at a rear upper end thereof. A clamping member 5 is disposed within the fixing hood portion 3 so that the clamping member 5 clamps one end of a leg B of a fishing reel A on the body 1. The clamping member 5 comprises a base portion 7 made of a synthetic resin and a metal tip 11 with a recess 9 for receiving the leg. The base portion 7 is provided with a step 15 which abuts on a step 13 of the fixing hood portion 3.

The reel seat body 1 is provided with external threads 17 at the proximal end. A movable hood 23 made integrally with a hood portion 19 and a nut portion 21 engages with the external threads 17. The movable hood 23 may be made of a metal material, but it is preferably made of a synthetic resin material for costs reduction. A fastening metal link or a fastening piece 25 is rotatably disposed within the hood portion 19 so that the link 25 is adapted to fasten the other end of the leg B.

When an outer cylinder 27 secured to the exterior of the movable hood 23 is turned in one direction so that the hood 23 is moved to the fastening direction, the fastening link 25 comes into contact with the other end of the leg B. Even if the movable hood 23 is further turned, the fastening link 25 provided rotatably with respect to the hood 19 continues to fasten the other end of the leg B without turning relative to the hood portion 19.

In FIG. 1, a reference number 29 denotes a trigger.

As shown in FIG. 2, the fastening link 25 comprises cylindrical portions 31 and 33, and a tapered portion 35 between the portions 31 and 33. The tapered portion 35 serves to fasten the other end of the leg B. The hood portion 19 is provided with a flange 37 for preventing the fastening link 25 from slipping out of the hood portion 19.

Figure 3:
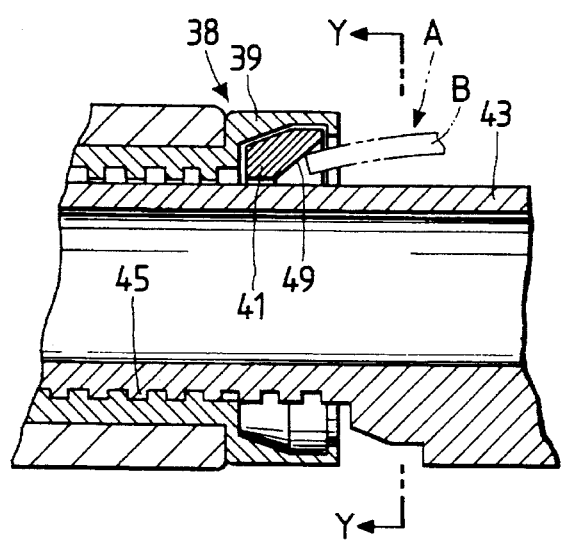
FIG. 3 is a fragmentary sectional view of another embodiment of the reel seats for fishing rods in accordance with the present invention.
Figure 4:
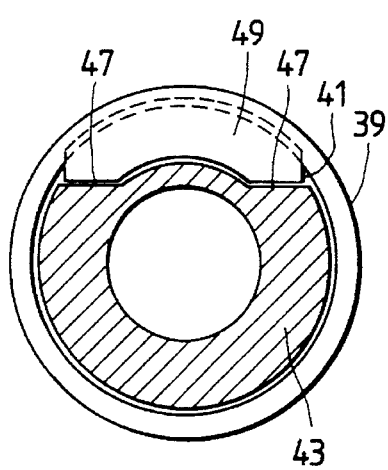
FIG. 4 is a sectional view taken along a line Y—Y in FIG. 3.

Referring now to FIGS. 3 and 4, a second embodiment of the reel seats for fishing rods in accordance with the present invention will be explained below.

A fastening metal piece 41 is disposed within a hood portion 39 of a movable hood 38 and also on an upper portion of a reel seat body 43. The fastening piece 41 is rotatable relative to the hood portion 39 while the piece 41 is not rotatable relative to the body 43 since the piece 41 is prevented from turning by external threads 45 formed on the body 43 and abutting faces 47 adjacent the end of the external threads 45. The fastening piece 41 has an inclined face 49 which receives and fastens the other end of the leg B of the fishing reel A.

It will be apparent from the foregoing description that, in the reel seats for fishing rods of the present invention, the hood portion slips on the fastening piece and thus the hood portion does not rub on the leg of the fishing reel. Accordingly, the fastening piece does not damage the leg and hood portion and can positively fasten the leg on the reel seat body.

The fastening metal piece can prevent the distal end of the leg of the fishing reel from biting on the piece and thus the fishing reel does not shake on the fishing rods.

What is claimed is:

1. A reel seat for mounting a reel having a mounting leg to a fishing rod, said reel seat comprising a movable hood which comprises a hood portion adapted to extend over at least a part of said leg and a nut portion for moving said movable hood longitudinally along said fishing rod toward and away from said reel, said hood portion and nut portion being unitary, and a fastening piece disposed in its entirety within said hood portion and rotatable with respect thereto, said fastening piece contacting and exerting a clamping force on said mounting leg when said movable hood is moved toward said reel.

2. A reel seat for a fishing rod according to claim 1, wherein said fastening piece is made of a metal material.

3. A reel seat for a fishing rod according to claim 1, wherein said fastening piece has a face which contacts said mounting leg, said contacting face sloping downwardly.

4. A reel seat for a fishing rod according to claim 1, wherein said fishing rod is provided with external threads at a proximal end thereof, and said nut portion is provided with complementary internal threads to thereby move said movable hood longitudinally along said fishing rod toward and away from said reel.

5. A reel seat for a fishing rod according to claim 1, wherein said hood portion is cylindrical in shape.

6. A reel seat for a fishing rod according to claim 1, wherein said reel seat consists essentially of said movable hood.

* * * * *